UNITED STATES PATENT OFFICE.

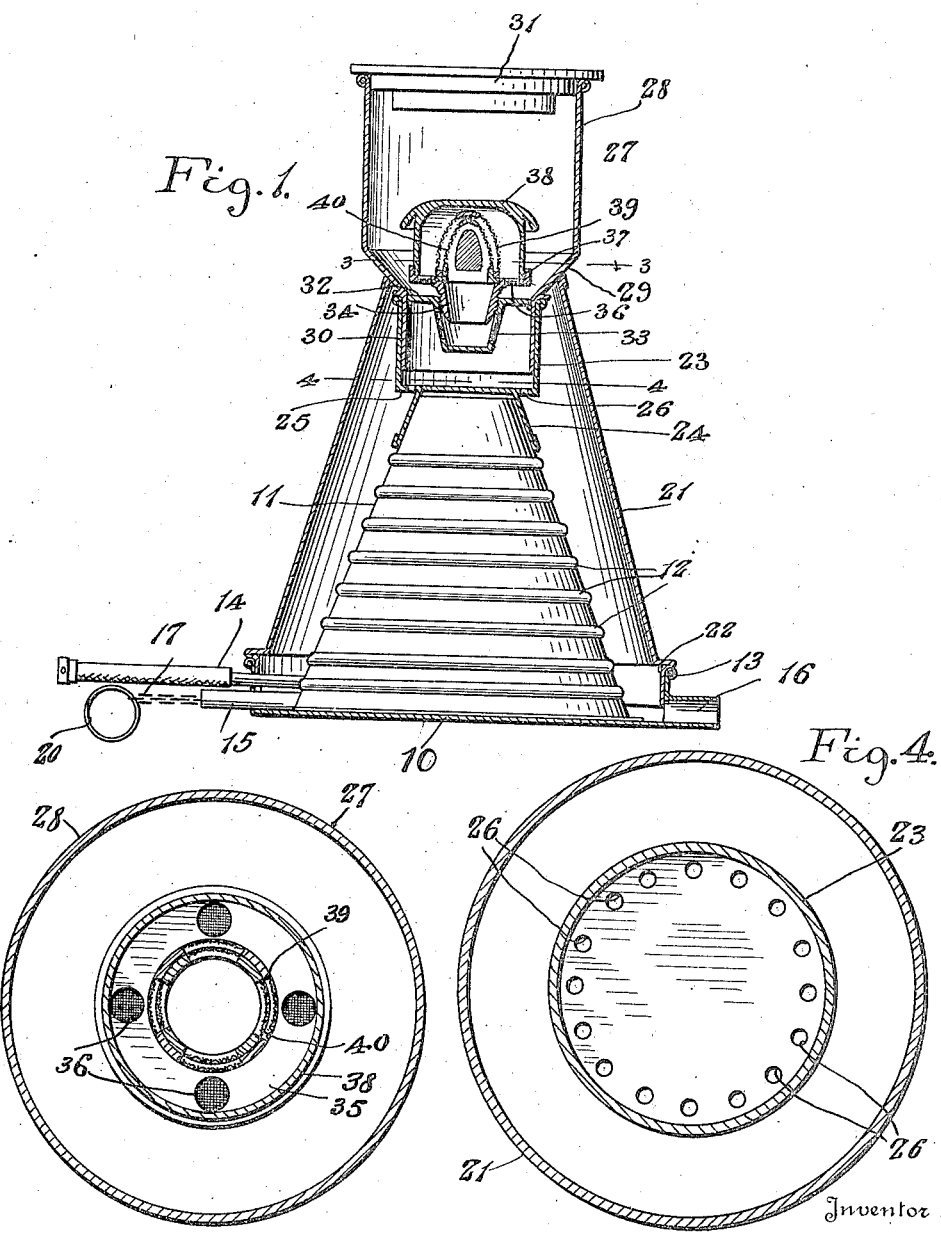

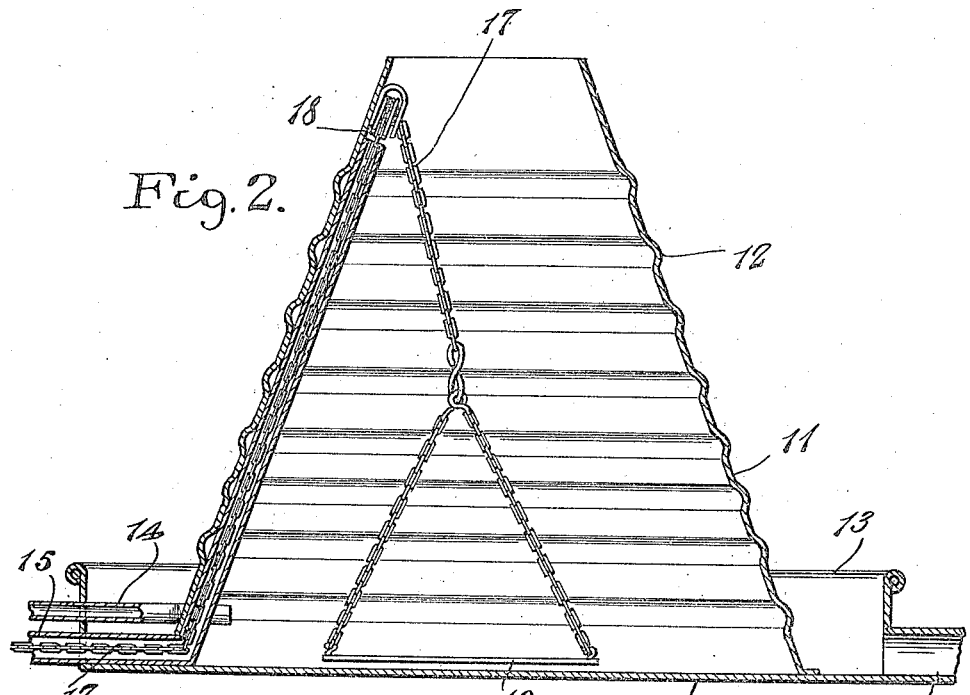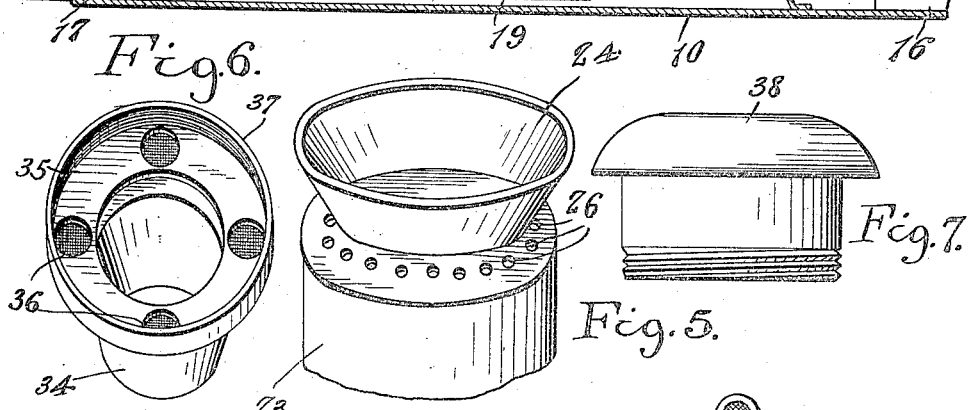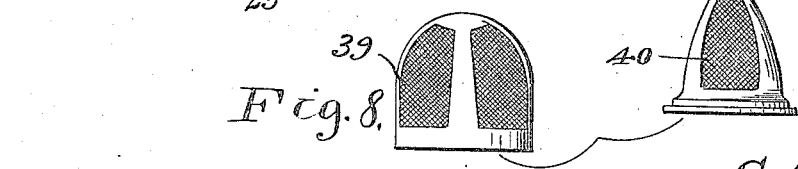

GEORGE A. WILSON, OF LOUISVILLE, NEW YORK.

MILK STRAINER AND COOLER.

1,301,775.  Specification of Letters Patent.  Patented Apr. 22, 1919.

Application filed September 8, 1916, Serial No. 119,057. Renewed February 21, 1919. Serial No. 278,514.

*To all whom it may concern:*

Be it known that I, GEORGE A. WILSON, a citizen of the United States, residing at Louisville, in the county of St. Lawrence, and State of New York, have invented certain new and useful Improvements in Milk Strainers and Coolers; and I do hereby declare the following to be a full, clear, and exact description of the invention, such as will enable others skilled in the art to which it appertains to make and use the same.

This invention relates to improvements in combined milk strainers and coolers, and has for its object to provide a simple and efficient device which will effectively strain, aerate and cool the milk so as to remove the impurities, animal heat and smell and rapidly cool the milk, thus reducing to a minimum the time required to cool and strain the milk and consequently rendering the milk less liable to contamination.

With this and other objects in view, the invention consists in the novel construction, combination and arrangement of parts as will be hereinafter specifically described, claimed and illustrated in the accompanying drawings, in which:

Figure 1 represents a vertical sectional view, through the improved cooler, the frusto-conical body being shown in side elevation.

Fig. 2 represents an enlarged vertical sectional view through the body, the outer casing and strainer being removed, Fig. 3 represents a transverse sectional view on the line 3—3 of Fig. 1, Fig. 4 represents a horizontal sectional view on the line 4—4 of Fig. 1, Fig. 5 represents an inverted perspective view of a part of the strainer detached, Fig. 6 represents a perspective view of another part of the strainer, Fig. 7 represents a side elevation of the cap removed, Fig. 8 represents side elevations of the strainers removed.

Referring to the drawings in detail, wherein similar reference numerals designate corresponding parts throughout the several views, the numeral 10 indicates the bottom or base plate of the cooler upon which is supported the frusto-conical and hollow body 11 of the cooler, preferably formed with annular or spiral corrugations 12. The outer edge of the plate 10 is connected with an upstanding flange 13 providing an annular tray and the lower portion of the body 12 is connected with the water inlet pipe 14 and a water overflow pipe 15, which extends upwardly within the body and terminates adjacent the upper and relatively small end thereof, as clearly shown in Fig. 2. The milk which flows over the inclined surface of the body 11 and into the tray 13 is carried off by an outlet pipe 16.

A chain or other flexible member 17 is extended through the overflow pipe 15, over a pulley or guide 18 in the upper end of the body and from said pulley or guide the flexible member extends downwardly and is connected with an agitator plate 19, which may be moved vertically within the hollow body 11, for stirring or agitating the water therein by pulling upon the flexible member 17, which latter is preferably provided at its outer terminal with a handle or ring 20.

A substantially frusto-conical protecting casing 21 is arranged in concentrically spaced relation to the body 11 and is supported upon the flange 13 by a laterally projecting flange 22 formed adjacent the lower end of the cover.

A supporting member 23 having a downwardly flaring flange 24 is positioned upon the upper terminal of the frusto-conical body 11 and is formed in the offset portion 25 between the cylindrical body and the flange 24 with a plurality of openings 26, through which the milk flows in its downward passage through the cooler.

A strainer, designated generally by the numeral 27, includes a hollow body 28, having the inclined medial portion 29 and restricted lower terminal 30, which is supported in the upper cylindrical body portion of the supporting member 23 and is provided at its upper open end with a removable cap or cover 31. The upper edge of the casing 21 engages the inclined portion 29 of the hollow body of the strainer and assists in supporting the latter in operative position above the body 11 of the cooler. The partition 32 is arranged in the lower portion of the body 28 and is formed with a depending flange having openings therein in which are secured strainers 33, and the inner surface of the depending flange is screw threaded and receives the depending spout 34 carried by an annular plate 35, having openings therein in which are secured strainers 36. The annular plate 35 is formed with an upstanding internally screw threaded flange 37, in which is fitted a cap 38, which is of such shape and size as to accommodate the strainer elements 39 and 40.

In use, the milk to be strained and cooled is poured into the hollow body 28 of the strainer element, which constitutes a reservoir, and in passing through the strainers 36, 39, 40 and 33 the milk is thoroughly strained, and passing through the openings 26, it flows downwardly over the inclined surface of the frusto-conical cooler body 11 and into the tray 13, from which it is conducted by the pipe 16. As the several parts composing the strainer are conveniently detachable, it is clearly evident that the strainer may be retained in a thoroughly clean and sanitary condition. The cooling water is conducted to the hollow body 11 by the inlet pipe 14 and is conducted from the body by the overflow pipe 15. The water contained in the body 11 may be agitated from time to time to insure thorough circulation by pulling the flexible member 17 and thus raising the agitator plate 19, which latter falls by gravity upon the bottom 10 when the flexible member 17 is released.

What I claim is:

1. In a milk cooler, a bottom plate, a frusto-conical body supported on said bottom plate, inlet and overflow pipes connected with said hollow body, a flexible member extending through said overflow pipe and into said hollow body, and an agitator connected with the inner end of said flexible member.

2. In a milk cooler, a bottom plate, a frusto-conical body supported upon said plate, a water inlet pipe connected with the lower portion of said body, an overflow pipe extending upwardly within said hollow body, a flexible member slidably mounted in said overflow pipe and extending downwardly within said hollow body, and an agitator connected with the inner end of said flexible member.

3. In a milk cooler, a bottom plate, a frusto-conical body secured to the plate, an upstanding flange formed on the edge of the plate and arranged in spaced relation to said body to provide an annular tray, a frusto-conical casing resting on the edge of the flange, a cup-shaped member located within said casing over the frusto-conical body and having a series of circularly arranged openings in the bottom wall thereof for distributing milk evenly over the body, and a flared flange formed upon the bottom wall of the cup-shaped member and receiving the apex of the frusto-conical body.

In testimony whereof I affix my signature in presence of two witnesses.

GEORGE A. WILSON.

Witnesses:
 AMOS E. CURRY,
 FRED. J. FLANNAGAN.